(12) United States Patent
Shank et al.

(10) Patent No.: US 7,087,565 B2
(45) Date of Patent: Aug. 8, 2006

(54) METHYLENE CHLORIDE-FREE AND OPTIONALLY METHANOL-FREE PAINT STRIPPER AND/OR GASKET REMOVER COMPOSITIONS

(75) Inventors: Gary K. Shank, Methuen, MA (US); Matthew P. Burdzy, South Windsor, CT (US)

(73) Assignee: Henkel Corporation, Rocky Hill, CT (US)

( * ) Notice: Subject to any disclaimer, the term of this patent is extended or adjusted under 35 U.S.C. 154(b) by 608 days.

(21) Appl. No.: 10/182,839

(22) PCT Filed: Aug. 30, 2001

(86) PCT No.: PCT/US01/27017
§ 371 (c)(1),
(2), (4) Date: Aug. 2, 2002

(87) PCT Pub. No.: WO02/18525
PCT Pub. Date: Mar. 7, 2002

(65) Prior Publication Data
US 2004/0058832 A1 Mar. 25, 2004

Related U.S. Application Data

(60) Provisional application No. 60/228,747, filed on Aug. 30, 2000.

(51) Int. Cl.
*C11D 7/50* (2006.01)
*C11D 7/26* (2006.01)
*B08B 7/00* (2006.01)

(52) U.S. Cl. ............... 510/212; 510/201; 510/202; 510/206; 510/505; 510/506; 134/38; 134/40

(58) Field of Classification Search ............ 134/38, 134/40; 510/212, 201, 202, 206, 505, 506
See application file for complete search history.

(56) References Cited

U.S. PATENT DOCUMENTS 4,619,711 A * 10/1986 Olbrueck et al. ............ 134/38
6,689,734 B1 * 2/2004 Doyel et al. ................ 510/410

* cited by examiner

*Primary Examiner*—Gregory Webb
(74) *Attorney, Agent, or Firm*—Steven C. Bauman

(57) ABSTRACT

The present invention is directed to methylene chloride-free, and optionally methanol-free, paint stripper and gasket remover formulations as alternatives to methylene chloride-based paint strippers and gasket removers.

27 Claims, 5 Drawing Sheets

1-Bromopropane

1-Chloro-2-Methylbenzene and
1-Chloro-4-Methylbenzene

1-Chloro-4-(Trifluoromethyl)benzene  1,2-Dichloro-4-(Trifluoromethyl)benzene

1-Bromopropane

1-Chloro-2-Methylbenzene and
1-Chloro-4-Methylbenzene

1-Chloro-4-(Trifluoromethyl)benzene 1,2-Dichloro-4-(Trifluoromethyl)benzene

METHYLENE CHLORIDE-FREE AND OPTIONALLY METHANOL-FREE PAINT STRIPPER AND/OR GASKET REMOVER COMPOSITIONS

This application claims the benefit of Provisional application No. 60/228,747 filed Aug. 30, 2000.

BACKGROUND OF THE INVENTION

1. Field of the Invention

The present invention is directed to methylene chloride-free, and optionally methanol-free, paint stripper and gasket remover formulations, as alternatives to methylene chloride-based paint strippers and gasket removers.

2. Brief Description of Related Technology

Methylene chloride has been the paint stripper and gasket remover of choice in industry for many years because it removes paints, coatings, and gaskets quickly, and works well on a variety of substrates, including wood and metal. The largest use for methylene chloride in the United States is paint stripping and gasket removal with about 40% of the 360 million pounds sold in the United States in 1994 being for this application.[1] Paint stripping and gasket remover products are widely used by maintenance workers at industrial complexes, aircraft painters, furniture makers, and homeowners. Other major uses for methylene chloride include metal cleaning and finishing in electronics manufacturing, and as a process solvent in the pharmaceutical and film coatings industries. Despite the versatility of methylene chloride in a variety of applications, some industry experts believe that the use of methylene chloride in paint stripper and gasket remover products will be curtailed by government regulations due to concern over its toxicity in humans. The U.S. Environmental Protection Agency currently classifies methylene chloride as a Group B2 probable human carcinogen of low carcinogenic hazard.[2]

[1] Internet site: http://pubs.acs.org/hotartcl/cenear/950925/pg1.html, Aug. 4, 2000, p. 11.
[2] Internet site: http://www.epa.gov/ttnuatw1/hlthef/methylen.html, Aug. 3, 2000, p. 1.

Accordingly, it would be desirable to replace methylene chloride in such products with a chemical having comparable abilities, while having a less extreme EPA classification.

Other halogenated solvents are known for use in paint stripping and/or gasket removing compositions. For instance, brominated solvents are known, such as n-propyl bromide. n-Propyl bromide is oftentimes recommended as a paint stripper or gasket remover as a cold cleaning solvent or in immersion applications. Another known halogenated solvent is benzotrifluoride (also known as 1-chloro-4-(trifluoromethyl)benzene). See U.S. Pat. No. 5,756,002.

A number of obstacles exist to the successful commercial development of a paint stripper and or gasket remover composition, even one containing a halogenated solvent other than the one carbon variety, such as methylene chloride (or chloroform or carbon tetrachloride). For instance, while a large container of n-propyl bromide might be handy in industrial, large scale operations where the parts to be stripped of paint or from which one or more gaskets to be removed are of significant size, in many instances it is not convenient to perform a dipping operation. Rather, many end users would prefer to be able to apply such a composition directly on the part and remove the unwanted paint or gasket shortly thereafter. However, halogenated solvents, such as n-propyl bromide, themselves are very often low viscosity and thus tend to either run off the part or evaporate quickly after application. This results in incomplete cleaning after one application or the necessity of many repeat applications, with much waste of material and time.

While thickeners may be used to enhance the viscosity of the halogenated solvent, which will improve the run off problem, most conventional thickeners, such as silicas, clays and the like, themselves do not have the proper film forming properties to allow the development of a wet film of the halogenated solvent. In addition, the addition of a thickener will likely create a two part system, requiring agitating mixing prior to application.

There therefore exists a need for formulations for stripping, removing and cleaning parts that are free of methylene chloride, and optionally methanol as well, and provide comparable performance abilities to formulations based on that halogenated solvent.

A methylene chloride-free, single phase, paint stripping and gasket removing composition, comprising a halogened hydrocarbon liquid, having more than one carbon atom; a polar oxygenated organic liquid; and a hydrogen bondable thickener, wherein the polar oxygenated organic liquid and hydrogen bondable thickener are present in sufficent amounts to render the composition in a single phase and to synergistically increase the viscosity of the composition beyond the viscosity of a composition, without either of the polar oxygenated organic liquid or the hydrogen bondable thickener in substantially similar amounts.

SUMMARY OF THE INVENTION

This invention provides formulations for paint stripper and gasket remover products that are based on solvents other than methylene chloride or any other solvent classified as a possible human carcinogen, and are effective alternatives to methylene chloride-based formulations for paint stripping and gasket removal.

The inventive compositions may be applied to the surface of a part in a controlled manner, and because of the rheological properties of the composition, will remain on the part for a time sufficient to allow the paint to be stripped or gasket to be removed to swell and thereafter be stripped or removed from the surface of the part. The swelling of the paint or gasket indicates that the composition has penetrated and/or dissolved to some degree the paint or gasket.

The alternative solvents used in this invention are halogenated. These solvents include brominated solvents such as n-propyl bromide (also known as 1-bromopropane), chlorinated solvents such as a mixture of 1-chloro-2-methylbenzene and 1-chloro-4-methylbenzene (also known as chlorotoluenes), and chlorinated/fluorinated solvents such as 1-chloro-4-(trifluoromethyl)benzene (also known as p-chlorobenzotrifluoride) and 1,2-dichloro-4-(trifluoromethyl)benzene (also known as dichlorobenzotrifluoride). This invention offers many advantages including that since none of the solvents employed in the formulations described herein are classified as potential human carcinogens, these formulations are effective alternatives to methylene chloride-based formulations or other formulations containing human carcinogens or possible human carcinogens for removing a range of paints, coatings, and gaskets quickly and efficiently.

In another aspect of the invention, compositions which include such alternative solvents are optionally also prepared with polar oxygenated organic compounds, other than methanol, to which many countries are seeking to limit user exposure. In addition to such polar oxygenated organic compounds other than methanol are included alcohols (other than methanol), diols, polyols, ethers, ketones, esters and the like.

DETAILED DESCRIPTION OF THE INVENTION

The present invention provides a single phase, paint stripper and gasket remover composition, which is free of methylene chloride. The composition in its broad form provides a halogenated hydrocarbon liquid, such as brominated or chlorinated hydrocarbon liquids, other than chlorinated one carbon compounds; a polar oxygenated organic liquid; and a hydrogen bondable thickener. The polar oxygenated organic liquid and hydrogen bondable thickener are present in sufficent amounts to render the composition in a single phase and to synergistically increase the viscosity of the composition beyond the viscosity of a composition without either of the polar oxygenated organic liquid or the hydrogen bondable thickener in substantially similar amounts.

Figure 1:
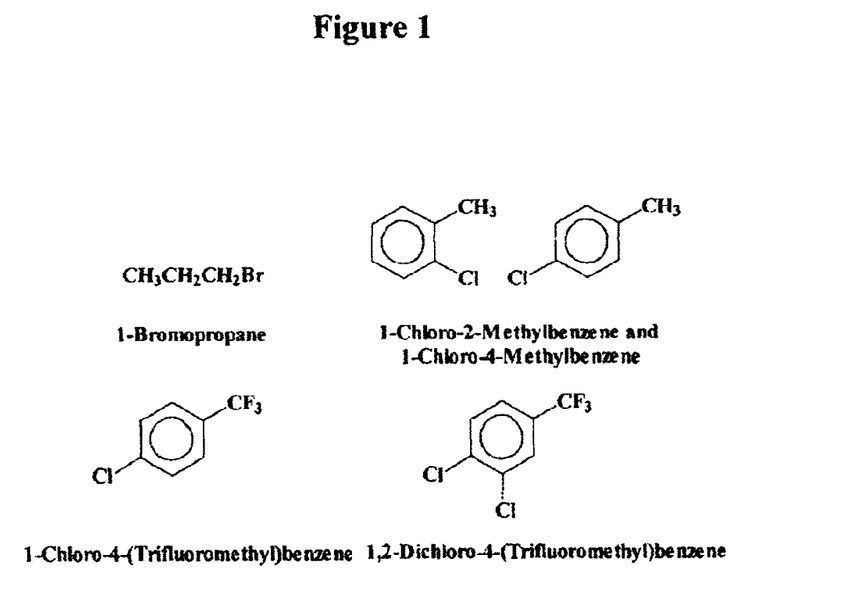
FIG. 1 depicts chemical structures of alternative solvents used in paint and gasket remover formulations within the present invention.
Figure 2:
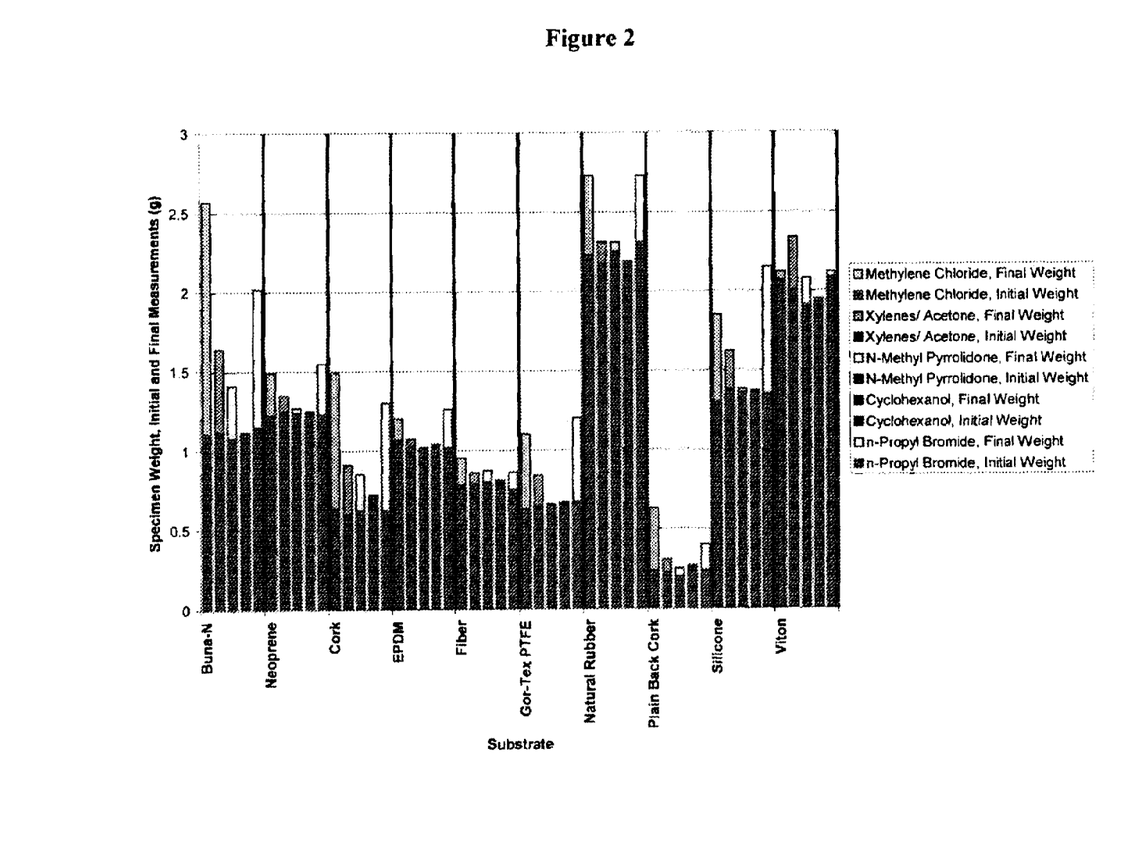
FIG. 2 depicts a comparison of n-propyl bromide formulation (Sample A) with formulations within the present invention as regards specimen weights, initial and final measurements (grams).
Figure 3:
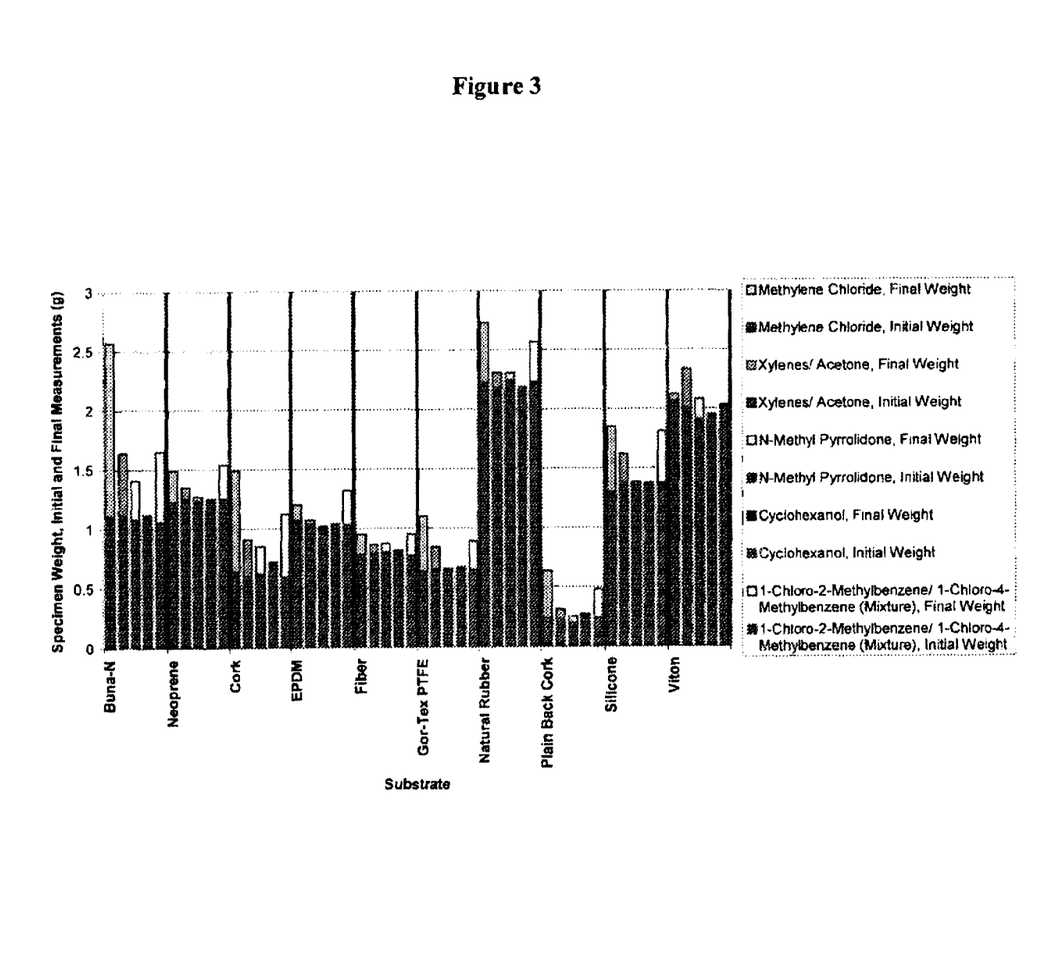
FIG. 3 depicts a comparison of 1-chloro-2-methylbenzene/1-chloro-4-methylbenzene (mixture) formulation (Sample B) with typical alternative formulations with the present invention as regards specimen weights, initial and final measurements (grams).
Figure 4:
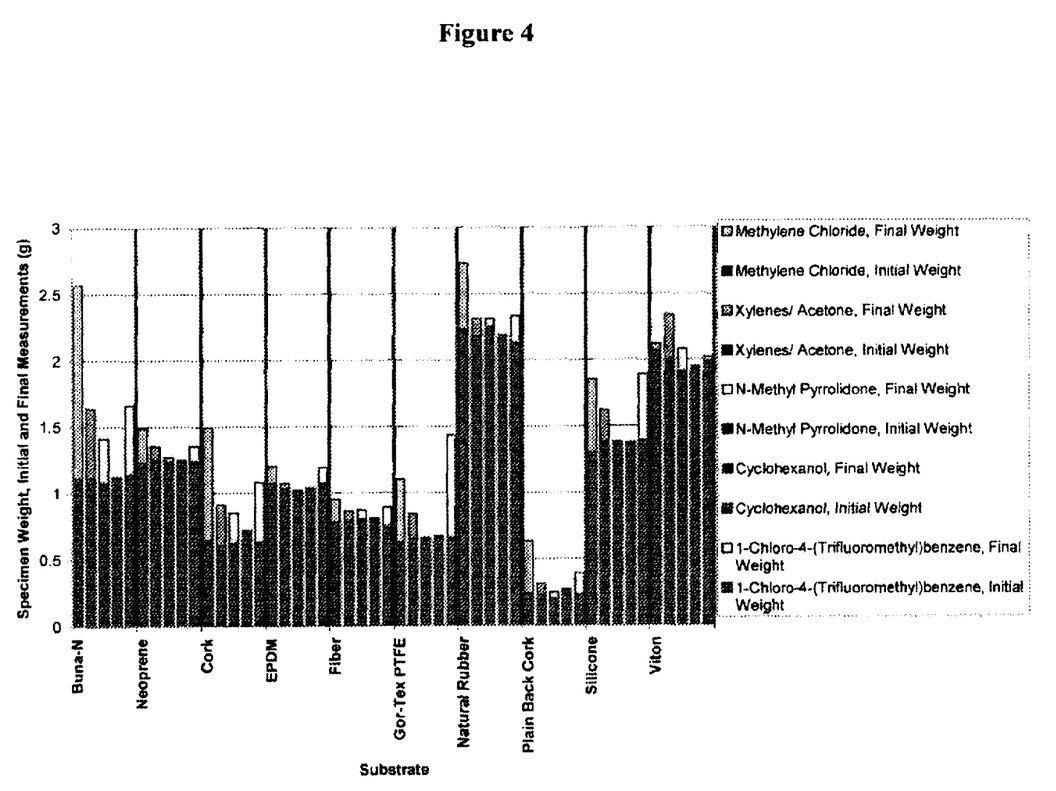
FIG. 4 depicts a comparison of 1-chloro-4-(trifluoromethyl)benzene formulation (Sample C) with typical alternative formulations with the present invention as regards specimen weights, initial and final measurements (grams).
Figure 5:
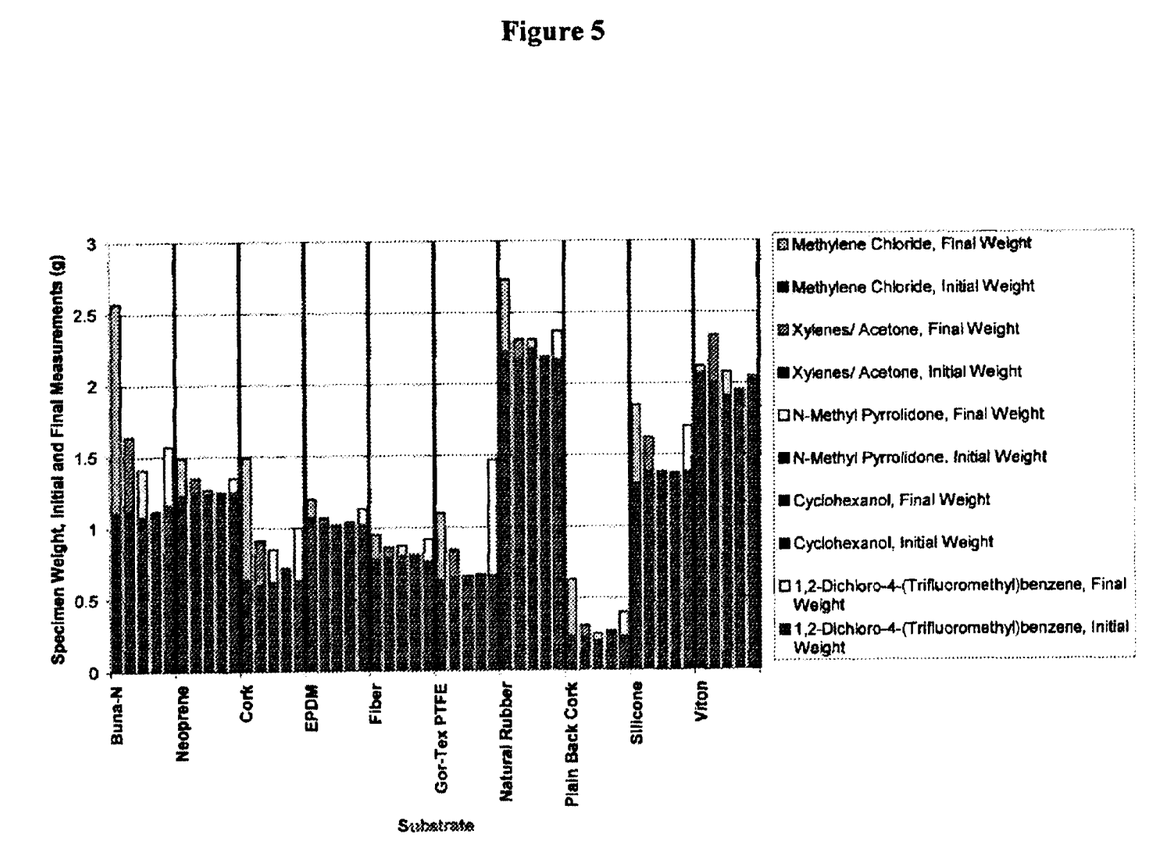
FIG. 5 depicts a comparison of 1,2-dichloro-4-(trifluoromethyl)benzene formulation (Sample D) with typical alternative formulations in accordance with the present invention as regards specimen weights, initial and final measurements (grams).

The inventive compositions are based on halogenated hydrocarbon liquids, such as brominated or chlorinated hydrocarbon liquids, other than chlorinated one carbon compounds, such as methylene chloride, chloroform, or carbon tetrachloride, which are each classified by the U.S. EPA as a human carcinogen. These halogenated hydrocarbon liquids include brominated is solvents such as n-propyl bromide (also known as 1-bromopropane), chlorinated solvents such as a mixture of 1-chloro-2-methylbenzene and 1-chloro-4-methylbenzene[3] (also known as chlorotoluenes), and chlorinated/fluorinated solvents such as 1-chloro-4-(trifluoromethyl)-benzene[4] (also known as p-chlorobenzotrifluoride) and 1,2-dichloro-4-(trifluoromethyl)-benzene[5] (also known as dichlorobenzotrifluoride). The chemical structures of these solvents are shown in FIG. 1.

[3] Tradename: OXSOL 10 which is a mixture of 1-chloro-2-methylbenzene (40–99 weight percent), CAS No. 95-49-8, and 1-chloro-4-methylbenzene (1–60 weight percent), CAS No. 106-43-4, manufactured by Occidental Chemical Corporation, Dallas, Tex.
[4] Tradename: OXSOL 100
[5] Tradename: OXSOL 1000

The halogenated hydrocarbon liquid should be present in an amount within the range of about 40 to about 90, such as about 50 to about 80, desirably about 60 to about 75 percent by weight of the inventive composition.

Prior to this invention, commercially available methylene chloride-free paint stripper and gasket remover formulations were based on alternative solvents that are generally not halogenated (e.g., xylenes, toluene, acetone, butyrolactone, d-limonene, benzyl alcohol, N-methylpyrrolidone, N,N-dimethylformamide, cyclohexanol, and the like) or that contain only small amounts of halogenated solvents. One advantage of using the halogenated organic solvents rather than the non-carcinogenic, non-halogenated hydrocarbon liquids described above is that the former appear to be more effective at swelling and removing a wide range of gasket materials. Brominated or chlorinated hydrocarbon liquids tend to be more aggressive than non-halogenated organic solvents because of a highly polarized carbon-halogen bond.

The polar oxygenated organic liquid may be selected from a variety of materials, including hydroxylated alkanols, hydroxylated alkenols, hydroylated cycloalkanols, hydroxylated cycloalkenols, ethers, aldehydes, ketones, esters and combinations thereof. These materials are capable of acting as hydrogen donors with a hydrogen acceptor. In the inventive compositions, the hydrogen acceptor may be the hydrogen bondable thickener. In these donor-acceptor pairs, while not intending to be bound by theory, hydrogen bonding is believed to occur which synergistically improves the thickening ability of either component alone in substantially similar amounts.

More specific examples of the hydroxylated alkanols include the alcohols, methanol, ethanol, propanols, butanols, pentanols, hexanols, heptanols, and the like, the glycols, ethylene glycols, propylene glycols, butylene glycols, and the like, and the triol, glycerol. Of course, combinations of these hydroxylated alkanols may be used as well.

More specific examples of the hydroxylated alkenols include propenols, butenols, pentenols, hexenols, heptenols and combinations thereof.

More specific examples of the hydroxylated cycloalkanols include cyclopentanols, cyclohexanols, cycloheptanols and combinations thereof.

More specific examples of the hydroxylated cycloalkenols include cyclopentenols, cyclohexenols, cycloheptenols and combinations thereof.

More specific examples of the ethers include dimethyl ether, diethyl ether, tetrahydrofuran and combinations thereof.

More specific examples of the aldehydes include acetaldehyde, propyl aldehyde, and combinations thereof.

More specific examples of the ketones include acetone, methylethyl ketone, cyclohexanone and combinations thereof.

More specific examples of the esters include ethyl formate, ethyl acetate, methyl acetate, and combinations thereof.

The polar oxygenated organic liquid should be present in an amount within the range of about 0.01 to about 20, such as about 0.5 to about 15, desirably about 1 to about 10 percent by weight of the inventive composition.

The hydrogen bondable thickener may be chosen from a host of materials, such as alkylated celluloses, like methyl cellulose, hyroxy propyl methyl cellulose and combinations thereof. A commercially available example of these materials includes METHOCEL 311, from Dow Chemical. Another appropriate choice for the hydrogen bondable thickener is alkylated silicas.

The hydrogen bondable thickener should be present in an amount within the range of about 0.01 to about 20, such as about 0.05 to about 10, desirably about 0.2 to about 0.5 percent by weight of the inventive composition.

The compositions may also include a surfactant, particularly where the components would benefit from the surfactant to maintain a single phase, and/or a paraffin wax, such as the commercially available PARVAN 131.

The invention is also directed to a method of preparing the inventive compositions. The method includes the provision of the respective components and mixing them together for a sufficient amount of time to form a single phase composition.

The invention is further directed to a method of removing a gasket or paint with the inventive compositions. The method includes the provision of a gasketed or a painted part (which for the purposes of this application shall also include coatings, such as lacquer, varnish, enamel and the like), dispensing the inventive composition on and/or about the gasketed or painted part, and allowing the inventive composition to swell the gasket and paint to permit facile removal thereof.

The invention is yet further directed to the inventive composition in an aerosol form, in which the composition further includes a propellant. In this regard, the present invention also contemplates articles of manufacture which include a container for packaging the inventive composition; the inventive composition disposed therewithin together with a propellant. The propellant should be chosen so that it is soluble or otherwise compatible with the overall composition such that it can be dispensed in a single phase, thereby avoiding separation of the propellant from the other components in the container during storage. Suitable propellants for use in the present invention include, without limitation, carbon dioxide, isobutane, dimethylether, 1,1,1,2-tetrafluoroethane and combinations thereof. When present, the propellant should be used in amounts sufficient to facilitate delivery of the composition from an aerosol container. For example, the propellant may be used in amounts of about 1 to about 50 percent by weight, desirably in an amount of about 25 to about 35 percent by weight of the inventive composition.

The present invention will be further illustrated by reference to the following non-limiting examples.

EXAMPLES

The formulations set forth in Tables 1–4 are based on the solvents shown in FIG. 1, and are examples of effective methylene chloride-free formulations for paint and gasket removers. Tables 5–8 show commercially available gasket remover formulations based on methylene chloride, xylenes and acetone, and N-methylpyrrolidone, and a formulation based on cyclohexanol, respectively.

TABLE 1

Methylene Chloride-Free Paint and Gasket Remover Formulation Based on n-Propyl Bromide as the Primary Solvent (Sample A)

| Component | Quantity (grams) | Order of Addition* | Weight Percentage |
| --- | --- | --- | --- |
| n-Propyl Bromide | 121.3 | 1 | 87.3 |
| Methanol | 12.1 | 2 | 8.7 |
| Hydroxy Propyl Methyl Cellulose | 0.5 | 3 | 0.36 |
| PARVAN 131 | 1.4 | 4 | 1 |
| Mineral Spirits | 2.8 | 5 | 2 |
| Total | 138.3 | — | ~100 |

*Notes: The mixture was thoroughly agitated after the addition of each component.

TABLE 2

Methylene Chloride-Free Paint and Gasket Remover Formulation Based on a Mixture of 1-Chloro-2-Methylbenzene and 1-Chloro-4-Methylbenzene as the Primary Solvents (Sample B)

| Component | Quantity (grams) | Order of Addition* | Weight Percentage |
| --- | --- | --- | --- |
| Mixture of 1-Chloro-2-Methylbenzene and 1-Chloro-4-Methylbenzene | 111.2 | 1 | 80.0 |
| Methanol | 11.1 | 2 | 8.0 |
| Acetone | 11.1 | 3 | 8.0 |
| Hydroxy Propyl Methyl Cellulose | 0.5 | 4 | 0.36 |
| PARVAN 131 | 1.4 | 5 | 1 |
| Mineral Spirits | 2.8 | 6 | 2 |
| Total | 138.1 | — | ~100 |

*Note: The mixture was thoroughly agitated after the addition of each component.

TABLE 3

Methylene Chloride-Free Paint and Gasket Remover Formulation Based on 1-Chloro-4-(Trifluoromethyl)-benzene as the Primary Solvent (Sample C)

| Component | Quantity (grams) | Order of Addition* | Weight Percentage |
| --- | --- | --- | --- |
| 1-Chloro-4-(Trifluoromethyl)-benzene | 108.4 | 1 | 76.4 |
| Methanol | 10.8 | 2 | 7.6 |
| Acetone | 10.8 | 3 | 7.6 |
| Hydroxy Propyl Methyl Cellulose | 0.8 | 4 | 0.58 |
| PARVAN 131 | 2.25 | 5 | 1.6 |
| Mineral Spirits | 4.5 | 6 | 3.3 |
| Total | 137.55 | — | ~100 |

*Note: The mixture was thoroughly agitated after the addition of each component.

TABLE 4

Methylene Chloride-Free Paint and Gasket Remover Formulation Based on 1,2-Dichloro-4-(Trifluoromethyl)-benzene as the Primary Solvent (Sample D)

| Component | Quantity (grams) | Order of Addition* | Weight Percentage |
| --- | --- | --- | --- |
| 1,2-Dichloro-4-(Trifluoromethyl)-benzene | 108.4 | 1 | 76.4 |
| Methanol | 10.8 | 2 | 7.6 |
| Acetone | 10.8 | 3 | 7.6 |
| Hydroxy Propyl Methyl Cellulose | 0.8 | 4 | 0.58 |
| PARVAN 131 | 2.25 | 5 | 1.6 |
| Mineral Spirits | 4.5 | 6 | 3.3 |
| Total | 137.55 | — | ~100 |

*Note: The mixture was thoroughly agitated after the addition of each component.

TABLE 5

Commercially Available Methylene Chloride-Based Paint and Gasket Remover Formulation (Sample E)

| Component | Quantity (grams) | Order of Addition* | Weight Percentage |
|---|---|---|---|
| Methylene Chloride | 122.5 | 1 | 58.1 |
| Methanol | 12.2 | 2 | 8.8 |
| Proprietary Ingredients* | 4.3 | 3 | 3.1 |
| Total | 139 | — | 100 |

*Note: The mixture was thoroughly agitated after the addition of each component.
*Proprietary ingredients include a thickener, refined paraffin wax, and a possible surfactant.

TABLE 6

Commercially Available Xylenes and Acetone-Based Paint and Gasket Remover Formulation (Sample F)

| Component | Quantity (grams) | Order of Addition* | Weight Percentage |
|---|---|---|---|
| Xylenes | 62.7 | 1 | 45.1 |
| Acetone | 63.1 | 2 | 45.4 |
| Methanol | 6.8 | 3 | 4.9 |
| Proprietary Ingredients* | 6.4 | 4 | 4.6 |
| Total | 139 | — | 100 |

*Note: The mixture was thoroughly agitated after the addition of each component.
*Proprietary ingredients include a thickener, refined paraffin wax, and a possible surfactant.

TABLE 7

Commercially Available N-Methyl Pyrrolidone-Based Paint and Gasket Remover Formulation (Sample G)

| Component | Quantity (grams) | Order of Addition* | Weight Percentage |
|---|---|---|---|
| N-Methyl Pyrrolidone | 122.5 | 1 | 88.1 |
| Methanol | 12.2 | 2 | 8.8 |
| Proprietary Ingredients* | 4.3 | 3 | 3.1 |
| Total | 139 | — | 100 |

*Note: The mixture was thoroughly agitated after the addition of each component.
*Proprietary ingredients include a thickener, refined paraffin wax, and a possible surfactant.

TABLE 8

Cyclohexanol-Based Paint and Gasket Remover Formulation (Sample H)

| Component | Quantity (grams) | Order of Addition* | Weight Percentage |
|---|---|---|---|
| Cyclohexanol | 122.5 | 1 | 88.1 |
| Methanol | 12.2 | 2 | 8.8 |
| Hydroxy Propyl Methyl Cellulose | 0.38 | 3 | 0.27 |
| PARVAN 131 | 1.08 | 4 | 0.78 |
| Mineral Spirits | 2.15 | 5 | 1.55 |
| Total | 138.31 | — | ~100 |

*Note: The mixture was thoroughly agitated after the addition of each component.

In Table 9–16, the formulations of Tables 1–8 are set forth again, though in an aerosol form—that is, a propellant has been added and the formulation packaged in an aerosol can.

TABLE 9

Methylene Chloride-Free Paint and Gasket Remover Formulation in Aerosol Form Based on n-Propyl Bromide as the Primary Solvent (Sample A)

| Component | Quantity (grams) | Order of Addition* | Weight Percentage |
|---|---|---|---|
| n-Propyl Bromide | 138.7 | 1 | 61.1 |
| Methanol | 13.8 | 2 | 6.1 |
| Hydroxy Propyl Methyl Cellulose | 0.57 | 3 | 0.25 |
| PARVAN 131 | 1.6 | 4 | 0.7 |
| Mineral Spirits | 2.74 | 5 | 1.2 |
| Propellant | 68.1 | 6 | 30.0 |
| Total | 225.5 | — | ~100 |

*Note: The mixture was thoroughly agitated after the addition of each component.

TABLE 10

Methylene Chloride-Free Paint and Gasket Remover Formulation in Aerosol Form Based on a Mixture of 1-Chloro-2-Methylbenzene and 1-Chloro-4-Methylbenzene as the Primary Solvents (Sample B)

| Component | Quantity (grams) | Order of Addition* | Weight Percentage |
|---|---|---|---|
| Mixture of 1-Chloro-2-Methylbenzene and 1-Chloro-4-Methylbenzene | 127.1 | 1 | 56.0 |
| Methanol | 12.7 | 2 | 5.6 |
| Acetone | 12.7 | 3 | 5.6 |
| Hydroxy Propyl Methyl Cellulose | 0.57 | 4 | 0.25 |
| PARVAN 131 | 1.6 | 5 | 0.7 |
| Mineral Spirits | 2.74 | 6 | 1.2 |
| Propellant | 68.1 | 7 | 30.0 |
| Total | 225.5 | — | ~100 |

*Note: The mixture was thoroughly agitated after the addition of each component.

TABLE 11

Methylene Chloride-Free Paint and Gasket Remover Formulation in Aerosol Form Based on 1-Chloro-4-(Trifluoromethyl)-benzene as the Primary Solvent (Sample C)

| Component | Quantity (grams) | Order of Addition* | Weight Percentage |
|---|---|---|---|
| 1-Chloro-4-(Trifluoromethyl)-benzene | 124.0 | 1 | 54.6 |
| Methanol | 12.3 | 2 | 5.4 |
| Acetone | 12.3 | 3 | 5.4 |
| Hydroxy Propyl Methyl Cellulose | 0.91 | 4 | 0.4 |
| PARVAN 131 | 2.58 | 5 | 1.14 |
| Mineral Spirits | 5.15 | 6 | 2.28 |
| Propellant | 68.1 | 5 | 30.0 |
| Total | 225.34 | — | ~100 |

*Note: The mixture was thoroughly agitated after the addition of each component.

TABLE 12

Methylene Chloride-Free Paint and Gasket Remover Formulation in Aerosol Form Based on 1,2-Chloro-4-(Trifluoromethyl)-benzene as the Primary Solvent (Sample D)

| Component | Quantity (grams) | Order of Addition* | Weight Percentage |
|---|---|---|---|
| 1,2-Chloro-4-(Trifluoromethyl)-benzene | 124.0 | 1 | 54.6 |
| Methanol | 12.3 | 2 | 5.4 |
| Acetone | 12.3 | 3 | 5.4 |
| Hydroxy Propyl Methyl Cellulose | 0.91 | 4 | 0.4 |
| PARVAN 131 | 2.58 | 5 | 1.14 |
| Mineral Spirits | 5.15 | 5 | 2.28 |
| Propellant | 68.1 | 5 | 30.0 |
| Total | 225.34 | — | ~100 |

*Note: The mixture was thoroughly agitated after the addition of each component.

TABLE 13

Commercially Available Methylene Chloride-Based Paint and Gasket Remover Formulation in Aerosol Form (Sample E)

| Component | Quantity (grams) | Order of Addition* | Weight Percentage |
|---|---|---|---|
| Methylene Chloride | 140.0 | 1 | 61.7 |
| Methanol | 14.1 | 2 | 6.2 |
| Proprietary Ingredients* | 4.8 | 3 | 2.1 |
| Propellant | 68.1 | 4 | 30 |
| Total | 227 | — | 100 |

*Note: The mixture was thoroughly agitated after the addition of each component.
*Proprietary ingredients include a thickener, refined paraffin wax, and a possible surfactant.

TABLE 14

Commercially Available Xylenes and Acetone-Based Paint and Gasket Remover Formulation in Aerosol Form (Sample F)

| Component | Quantity (grams) | Order of Addition* | Weight Percentage |
|---|---|---|---|
| Xylenes | 71.7 | 1 | 31.6 |
| Acetone | 72.2 | 2 | 31.8 |
| Methanol | 7.7 | 3 | 3.4 |
| Proprietary Ingredients* | 7.3 | 4 | 3.2 |
| Propellant | 68.1 | 5 | 30 |
| Total | 227 | — | 100 |

*Note: The mixture was thoroughly agitated after the addition of each component.
*Proprietary ingredients include a thickener, refined paraffin wax, and a possible surfactant.

TABLE 15

Commercially Available N-Methyl Pyrrolidone-Based Paint and Gasket Remover Formulation in Aerosol Form (Formulation Sample G)

| Component | Quantity (grams) | Order of Addition* | Weight Percentage |
|---|---|---|---|
| N-Methyl Pyrrolidone | 140.0 | 1 | 61.7 |
| Methanol | 14.1 | 2 | 6.2 |
| Proprietary Ingredients* | 4.8 | 3 | 2.1 |
| Propellant | 68.1 | 4 | 30 |
| Total | 227 | — | 100 |

*Note: The mixture was thoroughly agitated after the addition of each component.
*Proprietary ingredients include a thickener, refined paraffin wax, and a possible surfactant.

TABLE 16

Cyclohexanol-Based Paint and Gasket Remover Formulation in Aerosol Form (Sample H)

| Component | Quantity (grams) | Order of Addition* | Weight Percentage |
|---|---|---|---|
| Cyclohexanol | 140.0 | 1 | 61.7 |
| Methanol | 14.1 | 2 | 6.2 |
| Hydroxy Propyl Methyl Cellulose | 0.43 | 3 | 0.19 |
| PARVIN 131 | 1.2 | 4 | 0.53 |
| Mineral Spirits | 2.4 | 5 | 1.06 |
| Propellant | 68.1 | 6 | 30 |
| Total | 226.2 | — | 100 |

*Note: The mixture was thoroughly agitated after the addition of each component.

In Tables 17–23, in addition to replacing methylene chloride with n-propyl bromide, n-propyl bromide was used together with hydroxy propyl methyl cellulose as a first control (Sample I), and with hydroxy propyl methyl cellulose and methanol as a second control (Sample J) in comparison with replacement alcohols, as set forth in Samples K–O. In addition to alcohols, diols, such as ethylene glycol, propylene glycols (i.e., 1,1- and 1,2-propylene glycol) and the like, polyols, such as glycerol and the like, ethers, such as dimethyl ether, diethyl ether and the like, aldehydes, such as acetaldehyde, ketones, such as acetone, methylethyl ketone and the like, and esters may be used. Broadly speaking, any organic liquid capable of forming a hydrogen donor-hydrogen acceptor pair with another component of the composition may be used, provided that it maintains a shelf stable, single phase composition.

These formulations were used to determine the relative thickening power of the combination of methyl cellulose and the alcohols. The thickening ability allows the formulation, once applied to a gasket for instance, to remain in place so that the formulation may swell the gasket, thereby allowing for removal from the part on which the gasket has been applied.

TABLE 17 n-Propyl Bromide/Methyl Cellulose Formulation (Sample J)

| Component | Quantity (grams) | Weight Percentage | Viscosity (cps) |
|---|---|---|---|
| n-Propyl Bromide | 61.45 | 99.6 | <3 |
| Hydroxy Propyl Methyl Cellulose | 0.263 | 0.4 | |
| Total | 61.713 | 100 | |

*Notes: The mixture was thoroughly agitated after the addition of each component.

A comparable formulation prepared with n-propyl bromide and methanol demonstrated a comparable viscosity.

TABLE 18 n-Propyl Bromide/Methanol/Methyl Cellulose Formulation (Sample J)

| Component | Quantity (grams) | Weight Percentage | Viscosity (cps) |
|---|---|---|---|
| n-Propyl Bromide | 61.45 | 88.7 | 14.5 |
| Methanol | 6.15 | 8.9 | |
| Hydroxy Propyl Methyl Cellulose | 0.263 | 0.4 | |
| Mineral Spirits | 1.40 | 2.0 | |
| Total | 69.263 | 100 | |

*Notes: The mixture was thoroughly agitated after the addition of each component.

TABLE 19 n-Propyl Bromide/Ethanol/Methyl Cellulose Formulation (Sample K)

| Component | Quantity (grams) | Weight Percentage | Viscosity (cps) |
|---|---|---|---|
| n-Propyl Bromide | 61.45 | 88.7 | 13.5 |
| Ethanol | 6.15 | 8.9 | |
| Hydroxy Propyl Methyl Cellulose | 0.263 | 0.4 | |
| Mineral Spirits | 1.40 | 2.0 | |
| Total | 69.263 | 100 | |

*Notes: The mixture was thoroughly agitated after the addition of each component

TABLE 20 n-Propyl Bromide/n-Propanol/Methyl Cellulose Formulation (Sample L)

| Component | Quantity (grams) | Weight Percentage | Viscosity (cps) |
|---|---|---|---|
| n-Propyl Bromide | 61.45 | 88.7 | 11.2 |
| n-Propanol | 6.15 | 8.9 | |
| Hydroxy Propyl Methyl Cellulose | 0.263 | 0.4 | |
| Mineral Spirits | 1.40 | 2.0 | |
| Total | 69.263 | 100 | |

*Notes: The mixture was thoroughly agitated after the addition of each component

TABLE 21 n-Propyl Bromide/1-Propanol/Methyl Cellulose Formulation (Sample M)

| Component | Quantity (grams) | Weight Percentage | Viscosity (cps) |
|---|---|---|---|
| n-Propyl Bromide | 61.45 | 88.7 | 6.9 |
| i-Propanol | 6.15 | 8.9 | |
| Hydroxy Propyl Methyl Cellulose | 0.263 | 0.4 | |
| Mineral Spirits | 1.40 | 2.0 | |
| Total | 69.263 | 100 | |

*Notes: The mixture was thoroughly agitated after the addition of each component

TABLE 22 n-Propyl Bromide/n-Butanol/Methyl Cellulose Formulation (Sample N)

| Component | Quantity (grams) | Weight Percentage | Viscosity (cps) |
|---|---|---|---|
| n-Propyl Bromide | 61.45 | 88.7 | 6.7 |
| n-Butanol | 6.15 | 8.9 | |
| Hydroxy Propyl Methyl Cellulose | 0.263 | 0.4 | |
| Mineral Spirits | 1.4 | 2.0 | |
| Total | 69.263 | 100 | |

*Notes: The mixture was thoroughly agitated after the addition of each component

TABLE 23 n-Propyl Bromide/Cyclohexanol/Methyl Cellulose Formulation (Sample O)

| Component | Quantity (grams) | Weight Percentage | Viscosity (cps) |
|---|---|---|---|
| n-Propyl Bromide | 61.45 | 88.7 | 4.4 |
| Cyclohexanol | 6.15 | 8.9 | |
| Hydroxy Propyl Methyl Cellulose | 0.263 | 0.4 | |
| Mineral Spirits | 0.263 | 2.0 | |
| Total | 69.263 | 100 | |

*Notes: The mixture was thoroughly agitated after the addition of each component

Evaluation of Formulations as Regards Swellability

The formulations set forth in Tables 1–8 and 17–23 were evaluated in accordance with ASTM D 543-95, *Standard Practices for Evaluating the Resistance of Plastics to Chemical Reagents*. In this test method, the specimens are first measured for dimensions and weight.[6] The specimens are then immersed in each formulation for a period of time of about 10 minutes at room temperature, removed from the formulation and dried with a paper wipe, and measured again for weight and dimensional changes. The types of specimens evaluated are shown in Table 24.

[6] The dimensions of the test specimens were typically 1"×1"×1/16".

TABLE 24

Types of Specimens Used to Evaluate New Gasket Remover Formulations
Types of Samples

| | |
|---|---|
| Buna-N | Natural Rubber |
| Cork | Neoprene |
| EPDM | Plain Back Cork |
| Fiber | Silicone |
| Gore-Tex PTFE | Viton |

An indicator of performance in this test is sample swelling, since commercially available paint and gasket remover products remove most types of gaskets fairly quickly by significantly swelling the paint or gasket. Table 25 and FIGS. 2–5 show the average gain in weight exhibited by each type of sample which is a function of sample swelling. These data indicate that the best formulations for swelling a wide range of gasket materials generally contain halogenated organic solvents as their primary constituent (e.g., methylene chloride, n-propyl bromide, 1-chloro-2-methylbenzene/1-methyl-4-methylbenzene (mixture), 1-chloro-4-(trifluoromethyl)benzene, and 1,2-dichloro-4-(trifluoromethyl)benzene).

TABLE 25

Changes in Weight for Samples Immersed in Formulations Containing Various Primary Solvent Components Changes In Weight (Average Initial Weight In Grams/Average Final Weight in Grams/Average Percent Increase In Weight) for Samples Immersed In Formulations Containing the Following Primary Solvent Components

| Sample | Sample E, Methylene Chloride, Average Initial Weight (g) | Sample E, Methylene Chloride, Average Final Weight (g) | Sample E, Methylene Chloride, Average Increase in Weight (%) | Sample A, n-Propyl Bromide, Average Initial Weight (g) | Sample A, n-Propyl Bromide, Average Final Weight (g) | Sample A, n-Propyl Bromide, Average Increase in Weight (%) |
|---|---|---|---|---|---|---|
| Buna-N | 1.11 | 2.57 | 132 | 1.15 | 2.02 | 76 |
| Neoprene | 1.23 | 1.49 | 21 | 1.23 | 1.55 | 26 |
| Cork | 0.64 | 1.49 | 133 | 0.62 | 1.30 | 110 |
| EPDM | 1.07 | 1.20 | 12 | 1.02 | 1.26 | 24 |
| Fiber | 0.78 | 0.95 | 22 | 0.75 | 0.86 | 15 |
| Gore-Tex PTFE | 0.63 | 1.10 | 75 | 0.67 | 1.20 | 79 |
| Natural Rubber | 2.23 | 2.73 | 22 | 2.31 | 2.73 | 18 |
| Plain Back Cork | 0.24 | 0.63 | 163 | 0.24 | 0.40 | 67 |
| Silicone | 1.30 | 1.85 | 42 | 1.35 | 2.15 | 59 |
| Viton | 2.07 | 2.12 | 2 | 2.09 | 2.12 | 1 |

| Sample | Sample B, 1-Chloro-2-Methylbenzene and 1-Chloro-4-Methylbenzene (Mixture), Average Initial Weight (g) | Sample B, 1-Chloro-2-Methylbenzene and 1-Chloro-4-Methylbenzene (Mixture), Average Final Weight (g) | Sample B, 1-Chloro-2-Methylbenzene and 1-Chloro-4-Methylbenzene (Mixture), Average Increase In Weight (%) | Sample C, 1-Chloro-4-(Trifluoromethyl)-benzene, Average Initial Weight (g) | Sample C, 1-Chloro-4-(Trifluoromethyl)-benzene, Average Final Weight (g) | Sample C, 1-Chloro-4-(Trifluoromethyl)-benzene, Average Increase in Weight (%) |
|---|---|---|---|---|---|---|
| Buna-N | 1.06 | 1.65 | 56 | 1.14 | 1.66 | 46 |
| Neoprene | 1.25 | 1.54 | 23 | 1.24 | 1.35 | 9 |
| Cork | 0.59 | 1.12 | 90 | 0.63 | 1.08 | 71 |
| EPDM | 1.03 | 1.32 | 28 | 1.07 | 1.19 | 11 |
| Fiber | 0.77 | 0.95 | 23 | 0.75 | 0.89 | 19 |
| Gore-Tex PTFE | 0.65 | 0.89 | 37 | 0.66 | 1.43 | 117 |
| Natural Rubber | 2.23 | 2.57 | 15 | 2.13 | 2.33 | 9 |
| Plain Back Cork | 0.24 | 0.48 | 100 | 0.23 | 0.39 | 70 |
| Silicone | 1.37 | 1.81 | 32 | 1.39 | 1.89 | 36 |
| Viton | 2.03 | 2.03 | 0 | 1.99 | 2.02 | 2 |

| Sample | Sample D, 3,4-Dichloro-4-(Trifluoromethyl)-benzene, Average Initial Weight (g) | Sample D, 3,4-Dichloro-4-(Trifluoromethyl)-benzene, Average Final Weight (g) | Sample D, 3,4-Dichloro-4-(Trifluoromethyl)-benzene, Average Increase in Weight (%) | Sample F, Xylenes and Acetone (Mixture), Average Initial Weight (g) | Sample F, Xylenes and Acetone (Mixture), Average Final Weight (g) | Sample F, Xylenes and Acetone (Mixture), Average Increase in Weight (%) |
|---|---|---|---|---|---|---|
| Buna-N | 1.16 | 1.57 | 35 | 1.12 | 1.64 | 46 |
| Neoprene | 1.25 | 1.35 | 8 | 1.25 | 1.35 | 8 |

TABLE 25-continued

Changes in Weight for Samples Immersed in Formulations Containing Various Primary Solvent Components Changes In Weight (Average Initial Weight In Grams/Average Final Weight in Grams/Average Percent Increase In Weight) for Samples Immersed In Formulations Containing the Following Primary Solvent Components

| Cork | 0.63 | 1.00 | 59 | 0.60 | 0.91 | 52 |
| EPDM | 1.02 | 1.13 | 11 | 1.03 | 1.07 | 4 |
| Fiber | 0.76 | 0.92 | 21 | 0.79 | 0.86 | 9 |
| Gore-Tex PTFE | 0.66 | 1.47 | 123 | 0.65 | 0.84 | 29 |
| Natural Rubber | 2.17 | 2.37 | 9 | 2.18 | 2.31 | 6 |
| Plain Back Cork | 0.23 | 0.40 | 74 | 0.23 | 0.31 | 35 |
| Silicone | 1.38 | 1.70 | 23 | 1.38 | 1.62 | 17 |
| Viton | 2.03 | 2.05 | 1 | 2.01 | 2.34 | 16 |

| Sample | Sample G, N-Methyl Pyrrolidone, Average Initial Weight (g) | Sample G, N-Methyl Pyrrolidone, Average Final Weight (g) | Sample G, N-Methyl Pyrrolidone, Average Increase In Weight (%) | Sample H, Cyclohexanol, Average Initial Weight (g) | Sample H, Cyclohexanol, Average Final Weight (g) | Sample H, Cyclohexanol, Average Increase in Weight (%) |
|---|---|---|---|---|---|---|
| Buna-N | 1.08 | 1.41 | 31 | 1.11 | 1.12 | 1 |
| Neoprene | 1.24 | 1.27 | 2 | 1.25 | 1.25 | 0 |
| Cork | 0.62 | 0.85 | 37 | 0.65 | 0.72 | 11 |
| EPDM | 1.02 | 1.02 | 0 | 1.04 | 1.04 | 0 |
| Fiber | 0.80 | 0.87 | 9 | 0.77 | 0.81 | 5 |
| Gore-Tex PTFE | 0.65 | 0.66 | 2 | 0.66 | 0.67 | 2 |
| Natural Rubber | 2.25 | 2.31 | 3 | 2.19 | 2.19 | 0 |
| Plain Back Cork | 0.23 | 0.25 | 25 | 0.23 | 0.27 | 17 |
| Silicone | 1.36 | 1.38 | 1 | 1.36 | 1.37 | 1 |
| Viton | 1.91 | 2.08 | 9 | 1.95 | 1.95 | 0 |

Note: Each data point is an average of data collected for three samples.

In Table 26, the weight uptake of Buta-N samples was determined by the method described above in connection with formulations prepared along the lines of Samples I–O, save for the methyl cellulose component.

TABLE 26

Changes in Weight for Buta-N Samples Immersed in Formulations Containing n-Propyl Bromide and Various Alcohols

| Sample | Average Initial Weight (g) | Average Final Weight (g) | Average Increase in Weight (g) |
|---|---|---|---|
| I | 1.329 | 1.986 | 49 |
| J | 1.286 | 1.850 | 44 |
| K | 1.288 | 1.845 | 43.2 |
| L | 1.313 | 1.841 | 40.2 |
| M | 1.267 | 1.783 | 40.7 |
| N | 1.327 | 1.851 | 39.5 |
| O | 1.262 | 1.772 | 40.4 |

The following conclusions were drawn from these data:

Comparison of n-Propyl Bromide Formulation (Sample A) with Methylene Chloride Formulation (Sample E)

The n-propyl bromide formulation performs better than the methylene chloride formulation for swelling neoprene, EPDM, Gore-Tex PTFE, and silicone substrates.

The n-propyl bromide formulation performs about as well as the methylene chloride formulation for swelling Viton substrates, but neither of these formulations swells Viton substrates significantly.

Although the methylene chloride formulation performs better than the n-propyl bromide formulation for swelling Buna-N, cork, fiber, plain back cork, and natural rubber substrates, the n-propyl bromide formulation swells these substrates sufficiently to be effective in this application.

Comparison of n-Propyl Bromide Formulation (Sample A) with Formulations Based on Xylenes/Acetone (Sample F), N-Methyl Pyrrolidone (Sample G), and Cyclohexanol (Sample H)

The n-propyl bromide formulation performs better than the other three formulations for swelling Buna-N, neoprene, cork, EPDM, fiber, Gore-Tex PTFE, natural rubber, plain back cork, and silicone substrates.

The xylenes/acetone and N-methylpyrrolidone formulations perform better at swelling Viton substrates than the n-propyl bromide formulation. Neither the n-propyl bromide formulation nor the cyclohexanol formulation swells Viton substrates significantly.

Comparison of 1-Chloro-2-Methylbenzene/1-Chloro-4-Methylbenzene (Mixture) Formulation (Sample B) with Methylene Chloride Formulation (Sample E)

The 1-chloro-2-methylbenzene/1-chloro-4-methylbenzene formulation performs better than the methylene chloride formulation for swelling neoprene and EPDM substrates, and performs about as well at swelling the fiber substrate.

Although the methylene chloride formulation performs better than the 1-chloro-2-methylbenzene/1-chloro-4-methylbenzene formulation for swelling Buna-N, cork, Gore-Tex PTFE, natural rubber, plain back cork, and silicone substrates, the latter formulation swells these substrates sufficiently to be effective in this application. Neither of these formulations swells Viton substrates significantly.

Comparison of 1-Chloro-2-Methylbenzene/1-Chloro-4-Methylbenzene (Mixture) Formulation (Sample B) with Formulations Based on Xylenes/Acetone (Sample F), N-Methyl Pyrrolidone (Sample G), and Cyclohexanol (Sample H)

The 1-chloro-2-methylbenzene/1-chloro-4-methylbenzene formulation performs better than the other three formulations for swelling Buna-N, neoprene, cork, EPDM, fiber, Gore-Tex PTFE, natural rubber, plain back cork, and silicone substrates.

The xylenes/acetone and N-methylpyrrolidone formulations perform better than the 1-chloro-2-methylbenzene/1-chloro-4-methylbenzene formulation at swelling Viton substrates. Neither the 1-chloro-2-methylbenzene/1-chloro-4-methylbenzene formulation nor the cyclohexanol formulation swells Viton substrates significantly.

Comparison of 1-Chloro-4-(Trifluoromethyl)benzene Formulation (Sample C) with Methylene Chloride Formulation (Sample E)

The 1-chloro-4-(trifluoromethyl)-benzene formulation performs better than the methylene chloride formulation for swelling Gore-Tex PTFE substrates, and performs about as well for swelling EPDM, fiber, and Viton substrates. Neither of these formulations swells Viton substrates significantly.

Although the methylene chloride formulation performs better than the 1-chloro-4-(trifluoromethyl)-benzene formulation for swelling Buna-N, neoprene, cork, natural rubber, plain back cork, and silicone substrates, the latter formulation swells Buna-N, cork, plain back cork, and silicone substrates sufficiently to be effective in this application.

The 1-chloro-4-(trifluoromethyl)-benzene formulation does not swell neoprene or natural rubber substrates significantly.

Comparison of 1-Chloro-4-(Trifluoromethyl)-benzene Formulation (Sample C) with Formulations Based on Xylenes/Acetone (Sample F), N-Methyl Pyrrolidone (Sample G), and Cyclohexanol (Sample H)

The 1-chloro-4-(trifluoromethyl)benzene formulation performs better than the other three formulations for swelling cork, EPDM, fiber, Gore-Tex PTFE, natural rubber, plain back cork, and silicone substrates.

The 1-chloro-4-(trifluoromethyl)benzene formulation performs better than the N-methylpyrrolidone and cyclohexanol formulations for swelling Buna-N, neoprene, and natural rubber substrates, and performs about as well as the xylenes/acetone formulation for swelling Buna-N and neoprene substrates.

The xylenes/acetone and N-methylpyrrolidone formulations perform better than the 1-chloro-4-(trifluoromethyl)-benzene formulation for swelling Viton substrates. Neither the 1-chloro-4-(trifluoromethyl)-benzene formulation nor the cyclohexanol formulation swells Viton substrates significantly.

Comparison of 1,2-Dichloro-4-(Trifluoromethyl)-benzene Formulation (Sample D) with Methylene Chloride Formulation (Sample E)

The 1,2-dichloro-4-(trifluoromethyl)benzene formulation performs better than the methylene chloride formulation for swelling Gore-Tex PTFE substrates, and performs about as well for swelling EPDM, fiber, and Viton substrates. Neither formulation is very effective at swelling Viton substrates.

Although the methylene chloride formulation performed better than the 1,2-dichloro-4-(trifluoromethyl)-benzene formulation for swelling Buna-N, neoprene, cork, natural rubber, plain back cork, and silicone substrates, the latter formulation swelled Buna-N, cork, plain back cork, and silicone substrates sufficiently to be effective in this application.

The 1,2-dichloro-4-(trifluoromethyl)-benzene formulation does not swell neoprene or natural rubber significantly.

Comparison of 1,2-Dichloro-4-(Trifluoromethyl)-benzene Formulation (Sample D) and Formulations Based on Xylenes/Acetone (Sample F), N-Methyl Pyrrolidone (Sample G), and Cyclohexanol (Sample H)

The 1,2-dichloro-4-(trifluoromethyl)-benzene formulation performs better than the other three formulations for swelling cork, EPDM, fiber, Gore-Tex PTFE, natural rubber, plain back cork, and silicone substrates.

The xylenes/acetone formulation performs better than the 1,2-dichloro-4-(trifluoromethyl)-benzene formulation at swelling Buna-N and Viton substrates, and performs about as well as the latter formulation at swelling neoprene substrates.

The 1,2-dichloro-4-(trifluoromethyl)-benzene formulation performs better than the N-methyl pyrrolidone and cyclohexanol formulations at swelling buna-N, neoprene, cork, EPDM, fiber, Gore-Tex PTFE, natural rubber, plain back cork, and silicone substrates.

The N-methylpyrrolidone formulation performs better than the 1,2-dichloro-4-(trifluoromethyl)-benzene formulation at swelling Viton substrates. Neither the 1,2-dichloro-4-(trifluoromethyl)benzene formulation nor the cyclohexanol formulation swells Viton substrates significantly.

Methylene Chloride-Free, Non-Methanol Formulations

The ethanol-containing formulation unexpectedly remained in a single phase solution and in a film longer than methanol-containing formulations, upon visual inspection.

This invention replaces methylene chloride in paint and gasket remover products with one of several halogenated organic solvents or solvent combinations that are effective alternatives to methylene chloride-based formulations for the stripping of paints, and removal of gaskets. Although because of its terrific solvency characteristics, methylene chloride is difficult to replace in these formulations, the solvents used herein have been shown to be effective in swelling a range of gasket material substrates when used as the primary solvent in these formulations.

In addition, in another aspect, this invention uses a polar oxygenated organic liquid, desirably one other than methanol, in combination with a hydrogen bondable thickener to synergistically improve the thickening of the formulation. This synergistic improvement in thickness provides for a longer on-part time because of the reduced opportunity for formulation run-off, and as such allows for a greater opportunity for swelling of the material, such as a gasket or paint coating, to be removed.

This invention extends to the aerosol form of these formulations using a suitable propellant such as carbon dioxide, dimethyl ether, HFC-134a (1,1,1,2-tetrafluoroethane), hydrocarbon propellants (e.g., mixtures of butane, isobutane, and/or propane) or other suitable propellant.

The formulations described herein were compared to commercially available formulations based on methylene chloride, xylenes and acetone (mixture), and N-methyl pyrrolidone, and one experimental formulation based on cyclohexanol in terms of their ability to swell a number of different types of gasket material substrates. These comparisons have shown that none of these formulations consistently outperforms all of the others on all substrates, but some general trends were observed:

1. The inventive formulations outperformed the methylene chloride-based formulation in terms of swelling a number of substrates, and performed sufficiently well on the remaining substrates to be effective in this application. Regarding the latter substrates, differences in performance between the methylene chloride formulation and the formulations described herein should be subtle to the casual observer using these products.
2. The inventive formulations generally outperformed other commercially available formulations based on typical, nonhalogenated organic solvents such as xylenes/acetone (mixture), and N-methylpyrrolidone, and one formulation based on cyclohexanol.
3. Although the inventive formulations are effective at swelling a range of gasket material substrates, they appear to show the following general trend for effectiveness at swelling the range of substrates tested: n-propyl bromide formulation (Sample A)>1-chloro-2-methylbenzene/1-chloro-4-methylbenzene (mixture) formulation (Sample B)>1-chloro-4 -(trifluoromethyl) benzene formulation (Sample C) >1,2-dichloro-4-(trifluoromethyl)benzene formulation (Sample D).

Since none of the solvents employed in the formulations described herein are classified by the EPA as possible human carcinogens, these formulations are effective alternatives to methylene chloride-based formulations or other formulations containing possible human carcinogens for removing a range of paints, coatings, and gaskets quickly and efficiently.

The full scope of the invention is measured by the claims.

What is claimed is:

1. A methylene chloride-free, single phase, paint stripping and gasket removing composition, comprising:
   a. a halogenated hydrocarbon liquid, having more than one carbon atom;
   b. a polar oxygenated organic liquid; and
   c. a hydrogen bondable thickener,
wherein the polar oxygenated organic liquid and hydrogen bondable thickener are present in sufficient amounts to render the composition in a single phase and to synergistically increase the viscosity of the composition beyond the viscosity of a composition, without either of the polar oxygenated organic liquid or the hydrogen bondable thickener in substantially similar amounts.

2. The composition according to claim 1, wherein the halogenated hydrocarbon liquid is a member selected from the group consisting of n-propyl bromide, 1-chloro-2-methylbenzene, 1-chloro-4-methylbenzene, 1-chloro-4-(trifluoromethyl)-benzene, 1,2-dichloro-4-(trifluoromethyl)-benzene, and combinations thereof.

3. The composition according to claim 1, wherein the halogenated hydrocarbon liquid is n-propyl bromide.

4. The composition according to claim 1, wherein the halogenated hydrocarbon liquid is present in an amount within the range of about 40 to about 90 percent by weight.

5. The composition according to claim 1, wherein the halogenated hydrocarbon liquid is present in an amount within the range of about desirably 60 to about 75 percent by weight.

6. The composition according to claim 1, wherein the polar oxygenated organic liquid is a member selected from the group consisting of hydroxylated alkanols, hydroxylated alkenols, hydroylated cycloalkanols, hydroxylated cycloalkenols, ethers, ketones, esters and combinations thereof.

7. The composition according to claim 1, wherein the polar oxygenated organic liquid is a hydroxylated alkanol selected from the grout consisting of methanol, ethanol, propanols, butanols, pentanols, hexanols, heptanols, ethylene glycols, propylene glycols, butylene glycols, glycerol, and combinations thereof.

8. The composition according to claim 1, wherein the polar oxygenated organic liquid is a hydroxylated alkenol selected from the group consisting of propenols, butenols, pentenols, hexenols, heptenols and combinations thereof.

9. The composition according to claim 1, wherein the polar oxygenated organic liquid is a hydroxylated cycloalkanol selected from the group consisting of cyclopentanols, cyclohexanols, cycloheptanols and combinations thereof.

10. The composition according to claim 1, wherein the polar oxygenated organic liquid is a hydroxylated cycloalkenol selected from the group consisting of cyclopentanols, cyclohexanols, cycloheptanols and combinations thereof.

11. The composition according to claim 1, wherein the polar oxygenated organic liquid is an ether selected from the group consisting of dimethyl ether, diethyl ether, and combinations thereof.

12. The composition according to claim 1, wherein the polar oxygenated organic liquid is a ketone selected from the group consisting of acetone, methyl ethyl ketone, and combinations thereof.

13. The composition according to claim 1, wherein the polar oxygenated organic liquid is an ester selected from the group consisting of alkyl formate, methyl acetate, ethyl acetate, and combinations thereof.

14. The composition according to claim 1, wherein the polar oxygenated organic liquid is present in an amount within the range of about 0.1 to about 20 weight percent.

15. The composition according to claim 1, wherein the polar oxygenated organic liquid is present in an amount within the range of about 1 to about 10 percent by weight.

16. The composition according to claim 1, wherein the hydrogen bondable thickener is a member selected from the group consisting of alkylated celluloses, alkylated silicas and combinations thereof.

17. The composition according to claim 1, wherein the hydrogen bondable thickener is hydroxyl propyl methyl cellulose.

18. The composition according to claim 1, wherein the hydrogen bondable thickener is present in an amount within the range of about 0.01 to about 20 percent by weight.

19. The composition according to claim 1, further comprising a parrafin wax.

20. The composition according to claim 1, further comprising a surfactant.

21. A methylene chloride-free, single phase, paint stripping and gasket removing composition, comprising:
   a. n-propyl bromide, in an amount within the range of from about 40 to about 90 percent by weight;
   b. a polar oxygenated organic liquid selected from the group consisting of methanol, ethanol, and combinations thereof, in an amount within the range of from about 0.01 to about 20 percent by weight; and
   c. a hydrogen bondable thickener, wherein the hydrogen bondable thickener is an alkylated cellulose, in an amount within the range of from about 0.01 to about 20 percent by weight.

22. A method of preparing a composition according to claim 1, providing components (a) to (c) in a suitable amount and mixing for a time sufficient to form a single-phase paint stripper and gasket remover composition.

23. A method of stripping paint or a gasket with a composition according to claim 1, comprising the steps of:
   a. dispensing the composition onto a paint- or gasket-covered part;

b. allowing the composition to remain in contact with the covered part for a time sufficient to allow the paint or gasket to swell; and c. removing at least a portion of the swelled paint or gasket from the part.

24. The composition according to claim 1, in an aerosol form, further comprising a propellant.

25. A method of preparing a composition according to claim 21, providing components (a) to (c) in a suitable amount and mixing for a time sufficient to form a single-phase paint stripper and gasket remover composition.

26. A method of stripping paint or a gasket with a composition according to claim 21, comprising the steps of:
  a. dispensing the composition onto a paint- or gasket-covered part;
  b. allowing the composition to remain in contact with the covered part for a time sufficient to allow the paint or gasket to swell; and
  c. removing at least a portion of the swelled paint or gasket from the part.

27. The composition according to claim 21, in an aerosol form, further comprising a propellant.

* * * * *